United States Patent [19]

Matoushek

[11] Patent Number: 4,966,464

[45] Date of Patent: Oct. 30, 1990

[54] FUSING APPARATUS FOR THERMAL TRANSFER PRINTS

[75] Inventor: Robert J. Matoushek, Rochester, N.Y.

[73] Assignee: Eastman Kodak Company, Rochester, N.Y.

[21] Appl. No.: 457,037

[22] Filed: Dec. 26, 1989

[51] Int. Cl.[5] .............................................. G01D 15/10

[52] U.S. Cl. .............................. 346/76 P H; 219/216; 355/285; 355/282; 346/25

[58] Field of Search .................... 219/216; 346/76 PH, 346/25; 355/282, 285, 295, 289, 290

[56] References Cited

U.S. PATENT DOCUMENTS 4,618,240 10/1986 Sakurai et al. ...................... 219/216

FOREIGN PATENT DOCUMENTS 0024467 2/1986 Japan ............................ 346/76 P H

*Primary Examiner*—Bruce A. Reynolds
*Assistant Examiner*—Huan Tran
*Attorney, Agent, or Firm*—John D. Husser

[57] ABSTRACT

An improved fusing device for a thermal transfer printer having a print system for producing a receiver sheet bearing a transferred dye image. The fusing device includes a fuser drum comprising a heat conducting rigid cylinder shell portion and three roller assemblies constructed to rotate on parallel axes respectively at different locations around the periphery of the drum so as to constrain the path of drum rotation. One roller assembly is coupled to a rotary drive, and one is mounted for displaceable movement toward and away from the drum and resiliently urged toward the drum.

12 Claims, 3 Drawing Sheets

FUSING APPARATUS FOR THERMAL TRANSFER PRINTS

FIELD OF INVENTION

The present invention relates to thermal printing of the kind where dye is imagewise transferred from donor web sections to receiver sheets and, more specifically, to improved devices for fusing dye images upon the receiver after completion of such transfer.

BACKGROUND OF INVENTION

In thermal transfer printing successive sections of a donor sheet or web are fed through a linear printing region where they move, in contact with successive lines of a receiver, past a thermal print head comprising a linear array of selectively energizable, pixel size heater elements. The print head or other means urge the juxtaposed donor and receiver sections into intimate contact at the print zone so that dye is transferred from the donor to the receiver in the pixels beneath energized heaters of the array. In multicolor thermal printing the receiver is moved through the printing zone a plurality of times so that a plurality of different color image components (e.g. cyan, magenta and yellow) can be successively printed on the donor, in register.

One common configuration for effecting such multicolor printing is described in U.S. Pat. No. 4,745,413, wherein the donor sheet is clamped onto the periphery of a print drum which rotates successive line portions past a linear thermal print array. A web bearing successive donor sections of yellow, magenta and cyan dye is fed through the print zone, between the print array and receiver, in a timed relation so that a different color donor section moves through the print zone with the receiver, respectively during each of the print drum rotations.

Although not essential in thermal transfer printing, it is often desirable to heat and compress the dye image(s) on the surface of a receiver sheet. This post treatment, referred to as fusing, seals and stabilizes the dyes of the images and thereby enhances the keeping quality of the print. Such fusing has been accomplished by feeding the printed sheet through the nip of a fusing device comprising a heated roller and a pressure roller. The fusing device can be separate from the printer or located within the printer housing and positioned to receive the receiver as it is fed off of the printing drum.

Proper fusing of the dye image on receiver sheets depends upon the proper amounts of heat and pressure being applied uniformly to all areas of the image. To achieve these goals, prior art fusing devices have been fairly complex, e.g. requiring a heating drum with an accurately cylindrical periphery and expensive bearings and a pressure roller that is constructed and located with fairly high tolerances.

SUMMARY OF INVENTION

A significant objective of the present invention is to provide a device for uniformly fusing thermal transfer print media without the costly and complex fabrication and assembly problems of prior art fusing devices, such as described above. Important advantages of the present invention are that large drum bearings are not required and that the drum interior is readily accessible for ease in the mounting and electrical coupling of its heat source. Another advantage of the present invention is that two pressure nips are provided in a configuration that allows a biased-floating adjustment of the nip contact regions. Further advantages of the present invention are that the bias for such plural nip zones is provided at a single location and that the few bearing structures required are simple and not proximate to higher temperature regions of the fusing system.

In one aspect the present invention constitutes an improved fusing device for a thermal transfer printers of the kind producing a receiver sheet bearing a transferred dye image. The fusing device comprises a cylindrical fuser drum having a rigid, interior shell portion and a thin exterior cover layer. Three roller members, mounted for rotation on parallel axes, are located at generally equal-distances around the periphery of the fuser drum to constrain the path of drum rotation. One of the rollers is coupled to a rotary drive, and one of the rollers is mounted for displaceable movement toward and away from the drum and is resiliently urged toward the drum. A guide means is constructed and located for directing a print sheet around the periphery of the drum and between the nips of two of the rollers with the drum.

BRIEF DESCRIPTION OF DRAWINGS

The subsequent description of preferred embodiments refers to the accompanying drawings wherein.

DETAILED DESCRIPTION OF PREFERRED EMBODIMENTS

Figure 1:
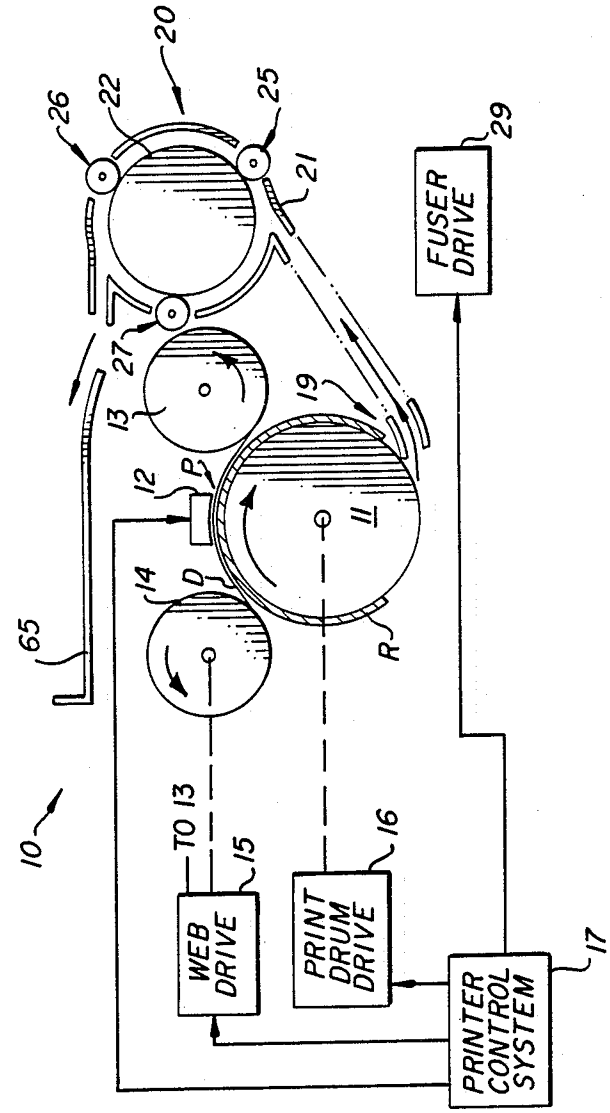
FIG. 1 is a schematic illustration of a thermal transfer printing apparatus incorporating one preferred embodiment of the present invention.
Figure 2:
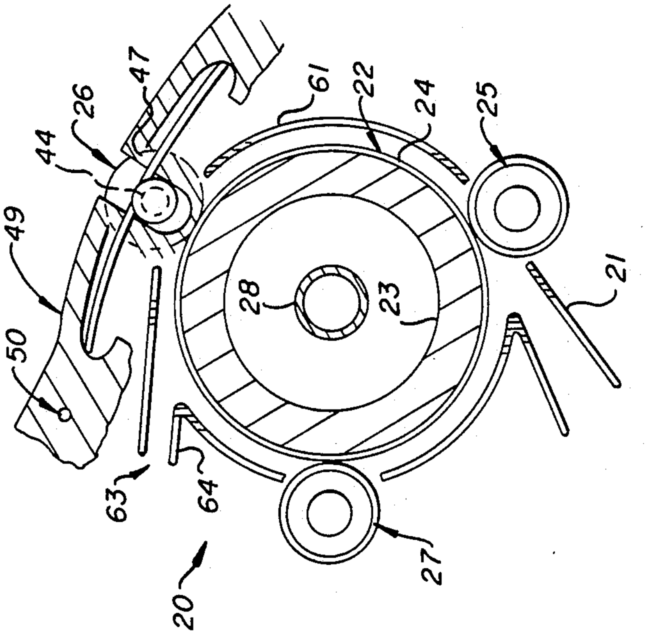
FIG. 2 (PRIOR ART)
FIG. 2 is a plan view showing a donor web useful for color printing in the FIG. 1 apparatus.

A thermal transfer printer 10 incorporating a preferred embodiment of fuser device, according to the present invention, is shown schematically in FIG. 1. The printer 10 comprises, in general, a cylindrical print drum 11 for supporting and rotating a receiver R through a print zone P, opposite thermal print head array 12. A donor web D bearing thermally transferable cyan, magenta and yellow dye sections (C, Y, M) in repeating series (see FIG. 2), is fed through the print zone P, (between a receiver R on the print drum and the print head 12) from a supply spool 14 to take up spool 13 by a drive system 15 coupled to the take up spool. The print drum drive 16 and the donor web drive 15 are controlled by printer control 17 and the donor web drive is constructed to allow the donor to be transported through the print region by the print drum. The print head also synchronized with the print drum by printer control 17 so that, as the receiver sheet R is rotated clockwise three passes through the print zone, different color separation image portions are printed from the sections CMY, in register onto its face.

After completion of three printing passes, the drum is rotated counter-clockwise so that the printed receiver sheet is unlatched and fed through the outlet guide passage 19 toward the fuser station 20. U.S. Pat. No. 4,815,870 shows one exemplary latch and unlatch mechanism which can be utilized. Concurrently filed U.S. Application Ser. No. 457,039, entitled "Clamping Apparatus for Thermal Transfer Printer" describes another preferred mechanism. Thus, a receiver sheet R bearing a multicolor thermal transfer image is fed into inlet 21 of fuser device 20 with its image surface facing away from the fusing drum 22.

Figure 3:
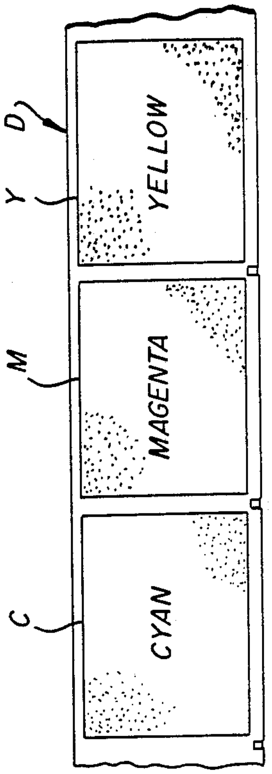
FIG. 3 is an enlarged cross-section of one preferred embodiment of the fuser device embodiment in accord with present invention.
Figure 4:
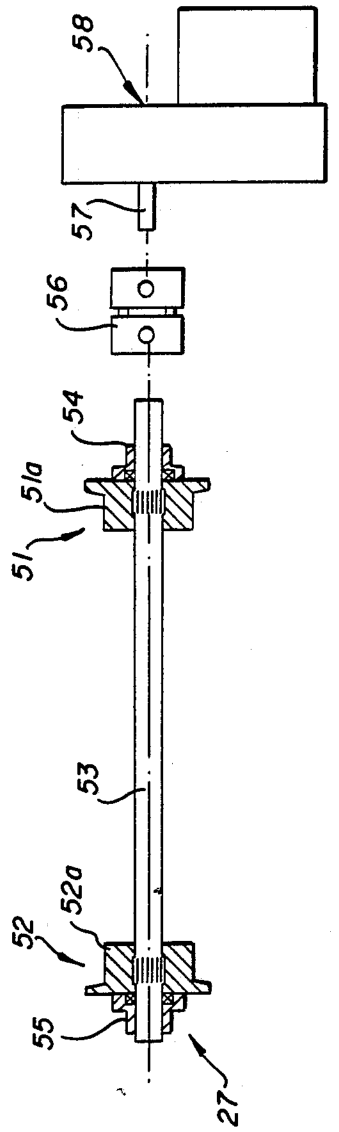
FIG. 4 is a longitudinal cross-section of the drive roller assembly of the FIG. 3 device.
Figure 5:
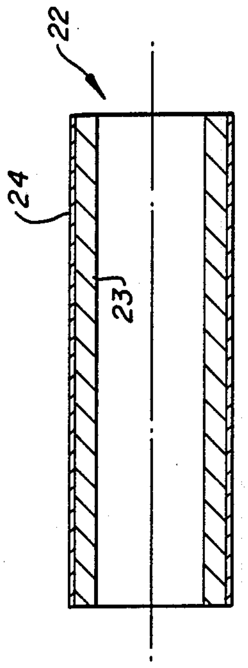
FIG. 5 is a longitudinal cross-section of the fuser drum assembly of the FIG. 3 device.

Fuser device 20 is shown in more detail in its assembled condition in FIG. 3 and its component structures are illustrated in FIGS. 4–7. In general, fuser device 20 comprises a floating fuser drum 22 that includes a rigid inner shell cylinder 23 formed e.g. of aluminum, and a coating 24 formed of a resilient material, e.g. silastic rubber. The drum 22 is supported and constrained for rotation by three roller assemblies 25, 26, 27, which are mounted within the printer housing for rotation on parallel axes at generally equidistant spacings around the periphery of the drum 22. As shown in FIG. 5 as well as FIG. 3, the drum 22 has open ends so that radiant heater tube 28 can be easily mounted within. Sheet guides 61 and 62 are spaced around the drum periphery to direct the lead end of a sheet under the nips of assemblies 25 and 26 and then out egress 63.

Figure 6:
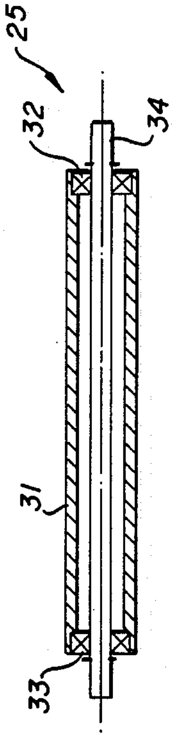
FIG. 6 is a longitudinal cross-section of the input nip roller of the FIG. 3 device.

Referring to FIG. 6 as well as FIG. 3, roller assembly 25 comprises an elongated tube 31 having a polished outer surface and end bearings 32, 33 which support the tube for rotation on shaft 34 whose ends are fixed to the printer mainframe.

Figure 7:
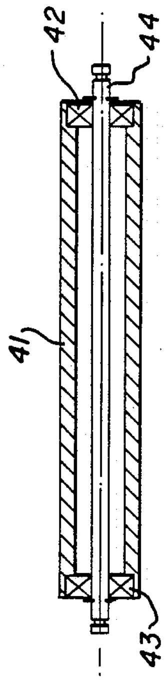
FIG. 7 is a longitudinal cross-section of the biasing roller of the FIG. 3 device.

Referring to FIG. 7 as well as FIG. 3, the roller assembly 26 comprises an elongated, polished tube 41 having end bearings 42, 43, which support it for rotation on shaft 44. Unlike shaft 34, the ends of shaft 44 are mounted for sliding movement, at each end, in brackets 46, are provided on a removable housing section 49. The brackets 46 each have slots 47 configured so that the shaft 44 can slide therein toward and away from drum 22 in a direction substantially radial to the drum cylinder. As shown in FIG. 3 wire springs 48 are mounted to the housing section 49 and over the ends of shaft 44 to resiliently urge the shaft ends, and its supported roller tube 41, radially toward drum 22. Preferably, the housing section 49 is removably mounted, e.g. by pivot 50, to the machine mainframe. The section including the spring loaded roller assembly 26 can thus be removed without fear of misalignment to provide access for servicing the fuser interior or removing jammed prints.

Referring to FIG. 4, as well as FIG. 3, it can be seen that roller assembly 27 comprises two flanged drive hubs 51, 52 that are rigidly fixed on a drive shaft 53. Shaft 53 is mounted on bearings 54, 55 and has one end engaged by coupling 56 to the output shaft 57 of a motor drive 58. The flanges of hubs 51, 52 are spaced slightly greater than the length of drum 22 so that their interior surfaces contact the drum ends and maintain its proper longitudinal position during operation. The drive surfaces **51*a*, 52*a* of the hubs are frictional and cooperate with the coating 24** to transmit rotation to the fuser drum via edge sectors of its outer periphery.

In operation, the lead edge of the incoming print is driven into the nip between the first rigidly mounted roller 25 and the drum 22. The thickness of the print shifts the drum toward the spring loaded roller, with drive roller acting as a fulcrum for its floating movement. The curved sheet metal guide 61 direct the lead edge around the heated drum and into the nip between the spring loaded roller and the drum. The spring loaded roller is forced away from the drum against its spring force. As the tail end of the Print passes through the system, the same sequence occurs in reverse. The leading end of the print sheet is then directed through outlet 63 by guides 64 and into output hopper 65.

The invention has been described in detail with particular reference to certain preferred embodiments thereof, but it will be understood that variations and modifications can be effected within the spirit and scope of the invention.

I claim:

1. In a thermal transfer printer having a print system for producing a receiver sheet bearing a transferred dye image, a fusing device comprising:

(a) a fuser drum comprising a heat conducting rigid cylinder shell portion;

(b) three roller assemblies constructed to rotate on parallel axes respectively at different locations around the periphery of said fuser drum so as to constrain the path of drum rotation, one of said rollers assemblies being coupled to a rotary drive, and one of said rollers being mounted for displaceable movement toward and away from said fuser drum and resiliently urged toward said drum; and (c) guide means for directing a print sheet around the periphery of said fuser drums and into nips between two of said rollers with said fuser drum.

2. The invention defined in claim 1 wherein one of said rollers assemblies has end flanges that extend along the side edges of said fuser drum to maintain the axial location of said fuser drum vis a vis said roller assemblies.

3. The invention defined in claim 1 wherein said roller assemblies are constructed and located around said fuser drum periphery so that a receiver sheet first enters the nip of said fuser drum and a first non-displaceable roller and next enters the nip of said fuser drum and a second roller which is said displaceable toward and away from said drum.

4. The invention defined in claim 3 wherein the third of said roller assemblies is coupled to said rotary drive and comprises a pair of hub elements having surfaces for driving said fuser drum and flanges for longitudinally constraining said fuser drum.

5. The invention defined in claim 4 wherein said third roller assembly is located approximately equidistantly from said first and second rollers so that said fuser drum can shift, on a fulcrum formed at the region of contact with said third roller assembly, toward and away from first and second rollers.

6. The invention defined in claim 5 wherein said guide means directs receiver sheets into the path of drum rotation at a location between the drum nips with said third and first roller assemblies and out of the path of drum rotation at a location between the drum nips with said second and third rollers.

7. In a thermal transfer printer having a print system for producing a receiver sheet bearing a transferred dye image, a fusing device comprising:

(a) a cylindrical fuser drum comprising a rigid, heated, interior shell and a resilient cover portion on the shell exterior periphery;

(b) two pressure roller members and a drive roller means respectively mounted for rotation on parallel axes at generally equal-distances around the periphery of said fuser drum to constrain the path of drum rotation, one of said pressure rollers having a fixed axis of rotation and one of said pressure rollers having an axis of rotation that is displaceable toward and away from said fuser drum and being resiliently urged toward said fuser drum; and (c) guide means for directing a print sheet into the path of drum rotation at a location upstream of said fixed axis roller and out of said path of drum rotation between said movable axis and said drive roller means.

8. The invention defined in claim 7 wherein one of said pressure rollers and drive roller means has end flanges that extend along the side edges of said fuser drum to maintain the axial location of said fuser drum.

9. The invention defined in claim 7 wherein said displaceable roller is removable as a unit with its mounting assembly, away from said fuser drum to provide access to said drum and the fuser feed path.

10. In a thermal transfer printer having a print system for producing a receiver sheet bearing a transferred dye image, a fusing device comprising:

(a) a cylindrical fuser drum comprising a metal interior shell portion with a resilient exterior cover;

(b) three roller means respectively mounted for rotation on parallel axes located at generally equal-distance around the periphery of said fuser drum to constrain the path of drum rotation;

(c) means for providing rotary drive to one of said roller means;

(d) means for mounting another of said roller means for urging it toward said fuser drum;

(e) a source of radiant energy mounted within said shell interior; and (f) guide means for directing a print sheet around the periphery of said fuser drum and between the nips of at least two of said roller means with said shell.

11. The invention defined in claim 10 wherein one of said roller means has end flanges that extend along the side edges of said fuser drum to maintain the axial location of said fuser drum.

12. The invention defined in claim 10 wherein said driven roller means is located approximately equidistantly from the other roller means so that said fuser drum can shift its longitudinal axis about a fulcrum, at said driven roller means, toward and away from first and second rollers.

* * * * *